US012802415B2

(12) United States Patent
Morgan et al.

(10) Patent No.: US 12,802,415 B2
(45) Date of Patent: Nov. 17, 2026

(54) PHYSICAL CAMERA PROVENANCE SCORING SYSTEM

(71) Applicant: iProov Limited, London (GB)

(72) Inventors: William J.H. Morgan, Copthorne (GB); Panagiotis Papadopoulos, London (GB); Gemma Bird, London (GB); Andrew Newell, West Sussex (GB)

(73) Assignee: iProov Limited, London (GB)

( * ) Notice: Subject to any disclaimer, the term of this patent is extended or adjusted under 35 U.S.C. 154(b) by 433 days.

(21) Appl. No.: 18/486,241

(22) Filed: Oct. 13, 2023

(65) Prior Publication Data

US 2024/0290079 A1 Aug. 29, 2024

Related U.S. Application Data

(60) Provisional application No. 63/486,648, filed on Feb. 23, 2023.

(51) Int. Cl.

*G06V 10/776* (2022.01)
*G06V 10/764* (2022.01)
*G06V 10/94* (2022.01)
*H04L 9/40* (2022.01)

(52) U.S. Cl.

CPC .......... *G06V 10/776* (2022.01); *G06V 10/764* (2022.01); *G06V 10/95* (2022.01); *H04L 63/1466* (2013.01); *G06V 2201/10* (2022.01)

(58) Field of Classification Search

CPC .... G06V 10/776; G06V 10/764; G06V 40/40; G06V 10/95; G06V 2201/10; H04L 63/1466; G06T 2207/10016
See application file for complete search history.

(56) References Cited

U.S. PATENT DOCUMENTS 12,413,865 B1 * 9/2025 Derakhshani ........ H04N 17/002
2020/0134148 A1 * 4/2020 Mortazavian ........... G06F 18/24
2024/0031178 A1 * 1/2024 Rouse ..................... G06F 21/36

* cited by examiner

*Primary Examiner* — Sumati Lefkowitz
*Assistant Examiner* — Michael Adam Shariff
(74) *Attorney, Agent, or Firm* — Oliver Strimpel

(57) ABSTRACT

A physical camera provenance scoring system issues challenges to a source of video imagery that purports to include a physical camera. The challenges may include requests for camera metadata, requests to change camera parameters, requests to deploy specific camera capabilities, and requests for video imagery. The challenges are designed to elicit responses that can be used to determine a likelihood score that video imagery was captured by a physical camera as opposed to a virtual camera being deployed in an injection attack. The responses may be input to a machine classifier trained on imagery of known provenance to generate the likelihood score. The score may depend on the consistency of responsive camera metadata with received imagery, the behavior and end state of the video source in response to sequences of challenges, the ability of the video source to execute challenges, and the timing and computational load associated with challenge execution.

24 Claims, 3 Drawing Sheets

PHYSICAL CAMERA PROVENANCE SCORING SYSTEM

CROSS REFERENCE TO RELATED APPLICATION

This application claims right of priority to and the benefits under 35 U.S.C. § 119(e) of U.S. provisional patent application Ser. No. 63/486,648, filed on Feb. 23, 2023.

BACKGROUND

Many sophisticated injection attacks against image-based verification systems, such as facial/iris recognition or palm print systems, require the use of a virtual video capture device. Such software not only emulates the capabilities of a physical camera device, but also enables an attacker to automate or manipulate the imagery provided in real time.

Consequently, before verifying the validity of any sort of document or biometric data, the type of video capture device (i.e., virtual or physical) that is being used must be verified at run time. This is especially necessary when operating in security models where the device is not trusted by default, such as within the user's web browser.

Contemporary web browsers do not provide an application programming interface (API) to determine if a video feed originates from a physical (hardware) or virtual (software) sourced video capture device. This is due to the ease of changing camera names or spoofing USB devices and vendor IDs with widely available and free software. Thus, developers simply cannot trust that the data (imagery) transmitted or the metadata exposed from the camera using today's Web APIs is genuine.

There is therefore a need for methods that help developers of image-based verification systems to detect whether imagery and metadata received during online user or document verification originates from an illegitimate source.

SUMMARY

In general, a physical camera provenance scoring system sends challenges to a source of video imagery that purports to be a physical camera. The challenges elicit responses that are analyzed to determine a likelihood that the source of video imagery is a physical camera as opposed to a virtual camera.

In general, in a first aspect, a method of verifying a provenance of video received from a video source, the method comprises: receiving metadata from the video source, wherein the metadata purports that video received from the video source is captured in real time by a physical camera associated with a user device; issuing one or more challenges to the video source; receiving from the video source results generated in response to the one or more challenges; inputting the video source results generated in response to the one or more challenges into a machine classifier, wherein the machine classifier is configured to distinguish between challenge results received from a physical camera and challenge results received from a virtual camera; using the machine classifier to issue a genuineness score indicating a likelihood that the video source results generated in response to the one or more challenges were received from a physical camera; when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera.

Various embodiments include one or more of the following features. The one or more challenges comprise a first challenge and a second challenge, and the second challenge is based at least in part on video source results received from the first challenge. The video source results received in response to the one or more challenges depend on an order in which the one or more challenges were issued. The genuineness score depends at least in part on a comparison of video source results from a first order in which the one or more challenges are issued and video source results from a second order in which the one or more challenges were issued. Video source results generated in response to the one or more challenges include information about a state of the video source following completion of the one or more challenges. The information about the state of the video source includes at least one of a state of a flash toggle, a state of a white balance toggle, and a frame rate. Inputting to the machine classifier a time taken for the video source results to be generated in response to the one or more challenges. The one or more challenges include a request for video source metadata. The one or more challenges include a request for video imagery. The video source results include video source metadata and video imagery and the genuineness score is based at least in part on a comparison of the video source metadata with the received video imagery. The one or more challenges include a request to change camera resolution and/or a request to use a flash. The video source comprises a camera connected to an end-user device, and the machine classifier is implemented on the end-user device. Sending the video source results to a server remote from the video source, wherein the machine classifier is implemented on the server. The genuineness score is used to determine which subsequent action of a plurality of subsequent actions is taken by software executing on an end user device. The video source results include an indication as to whether the video source performed an action requested by the one or more challenges. The one or more challenges request information about properties of a camera of the video source and the genuineness score depends at least in part on a comparison of the video source results with at least one of a camera device name and camera capabilities reported by metadata received from the video source. The one or more challenges affect a computational load on a system associated with the video source and the video results include information indicating the computational load on the system. The system associated with the video source includes a plurality of cameras, and the one or more challenges are directed independently to each camera. The system associated with the video source includes a plurality of cameras, and the one or more challenges are directed simultaneously to each camera. The video is received from the video source over a first imagery capture session and over a second imagery capture session, and the genuineness score is based in part on a comparison of video source results received in response to one or more challenges issued during the first imagery capture session with video source results received in response to one or more challenges issued during the second imagery capture session. Video source results are used to determine whether or not the received video was captured by a camera of at least one of a specific model and a specific class of camera. The video source results are used to determine at least one of a specific model and a class of a camera that captured the received video. Analyzing the received video to determine a first type of a camera that captured the video and using the video source results to determining a second type of camera that captured the received video; and wherein the genuineness score is based in part on a match between the first type of camera and the second type of camera. The one or more challenges request changes to video captured by the video source, and analyzing video imagery contained with the video source results to determine a type of camera that captured the received video. The requested changes include at least one of changes in resolution, exposure setting and focus of imagery captured by the video source; and analyzing the video imagery contained with the video source results includes determining whether the video imagery reflects the requested changes.

In general, in another aspect, a computer program product comprises: a non-transitory computer-readable medium with computer-readable instructions encoded thereon, wherein the computer-readable instructions, when processed by a processing device instruct the processing device to perform a method of verifying a provenance of video received from a video source, the method comprising: receiving metadata from the video source, wherein the metadata purports that video received from the video source is captured in real time by a physical camera associated with a user device; issuing one or more challenges to the video source; receiving from the video source results generated in response to the one or more challenges; inputting the video source results generated in response to the one or more challenges into a machine classifier, wherein the machine classifier is configured to distinguish between challenge results received from a physical camera and challenge results received from a virtual camera; using the machine classifier to issue a genuineness score indicating a likelihood that the video source results generated in response to the one or more challenges were received from a physical camera; and when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera.

In general, in a further aspect, a user device comprises: a memory for storing computer-readable instructions; and a processor connected to the memory, wherein the processor, when executing the computer-readable instructions, causes the user device to perform a method of verifying a provenance of video received from a video source, the method comprising: receiving metadata from the video source, wherein the metadata purports that video received from the video source is captured in real time by a physical camera associated with a user device; issuing one or more challenges to the video source; receiving from the video source results generated in response to the one or more challenges; inputting the video source results generated in response to the one or more challenges into a machine classifier, wherein the machine classifier is configured to distinguish between challenge results received from a physical camera and challenge results received from a virtual camera; using the machine classifier to issue a genuineness score indicating a likelihood that the video source results generated in response to the one or more challenges were received from a physical camera; and when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera.

DETAILED DESCRIPTION

A scoring system is used to distinguish data received from genuine cameras from data received from virtual cameras or other sources of imagery. As used herein, a genuine camera refers to a physical camera, such as one built into a mobile device such as a smartphone or a tablet, or a physical camera such as a webcam attached to a desktop system. Non-genuine cameras are referred to herein as virtual cameras that generate still or video imagery that attempts to mimic the output of genuine cameras. They include imagery that originated from a genuine camera but is replayed or imagery that was built from scratch using computer-generated imagery (CGI).

When the scoring system receives a video feed, it issues a request for the device name and the reported capabilities of the video device providing the feed. In response, the system generates a series of challenges for the video device. The challenges that are issued to the video device are designed to discriminate between a genuine camera and virtual camera. The challenges may be used in isolation or in combination.

As used herein, the term “video source” refers to the source of the imagery received by the scoring system. Such imagery may include still images as well as video. When the imagery is received from a genuine camera, the video source is an actual physical device, but when the imagery is received from a virtual camera or from other sources of imagery, i.e., from an attacker, the video source may include a physical device other than the purported one, or it may not involve a physical device, instead being generated by a computer model (CGI), a virtual machine, or an emulator.

When software executes within a web browser, the browser determines what kind of information can be retrieved directly from a video device providing imagery to the software. In particular, it is not possible to interrogate the device directly to determine its true make, model and physical connection to the system running the web browser. Furthermore, the device name and reported capabilities are readily spoofed. The methods and systems described herein are especially useful in this context to help determine whether the video device is genuine, i.e., a real physical device or not. Browsers implementing the standard web APIs do not provide a way to determine if a given video input originates from a physical or software camera, nor do they attest that a physical camera’s video input system is modified to supply manipulated video feeds.

Figure 1:
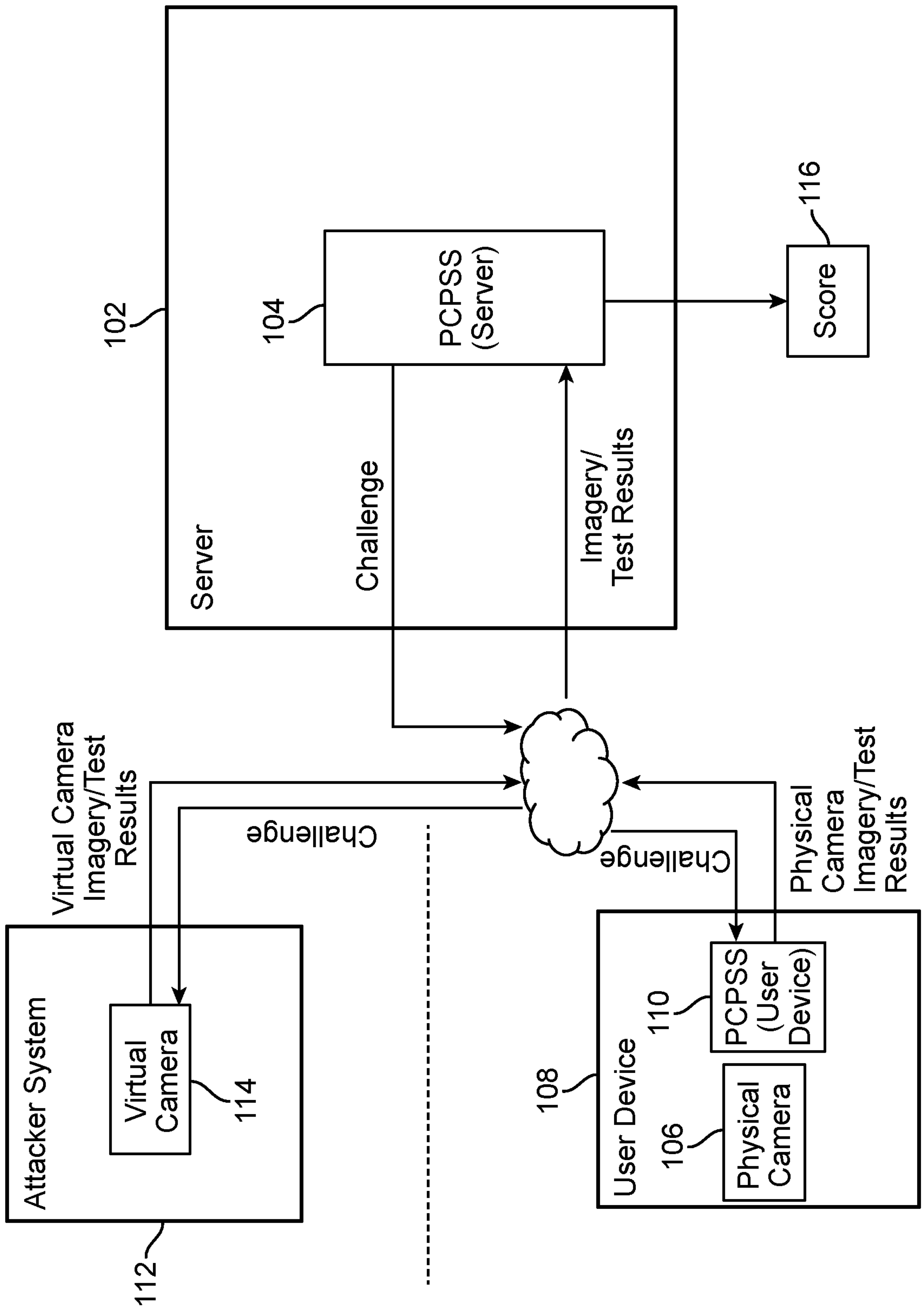
FIG. 1 is a high-level block diagram illustrating the use of a physical camera provenance scoring system.

FIG. 1 is a high-level block diagram illustrating the use of a physical camera provenance scoring system (PCPSS). In the described implementation, PCPSS includes two software components-PCPSS (User Device) 110 running on the (genuine) user device 108, which is in data communication with PCPSS (Server) 104 running on server 102. In various implementations, PCPSS executes on a user device without the use of a remote server component. In this case the various functions described below as being performed on server 102 by PCPD (Server) 104, are performed by PCPSS software executing on the user device. In some cases, the user device operates in stand-alone mode when connectivity to a server is unavailable, reconnecting when connectivity is restored, when further verifications or consistency checks may be performed.

Upon receipt of imagery purportedly originating from a physical camera on an end-user device, PCPSS (Server) issues a challenge back to the video source. The challenge is received by the video source, which, if genuine, is PCPSS (User Device) which executes the challenge on physical camera 106 built into or externally connected to user device 108. Alternatively, if the imagery originated from attacker system 112, the challenge is received by virtual camera 114. The video source, whether it is the user device or the attacker system, responds to the challenge, returning the results of the challenge to PCPSS (Server) 104. PCPSS (server) determines whether it has sufficient information as to whether the source of the imagery is genuine or whether further challenges are needed. Following the issuance of one or more further challenges, if required by PCPSS server software 104, PCPSS (Server) determines that it has sufficient information regarding the source of the imagery and outputs score 116 that is a measure of the likelihood that the imagery was received from a genuine physical camera.

Figure 2:
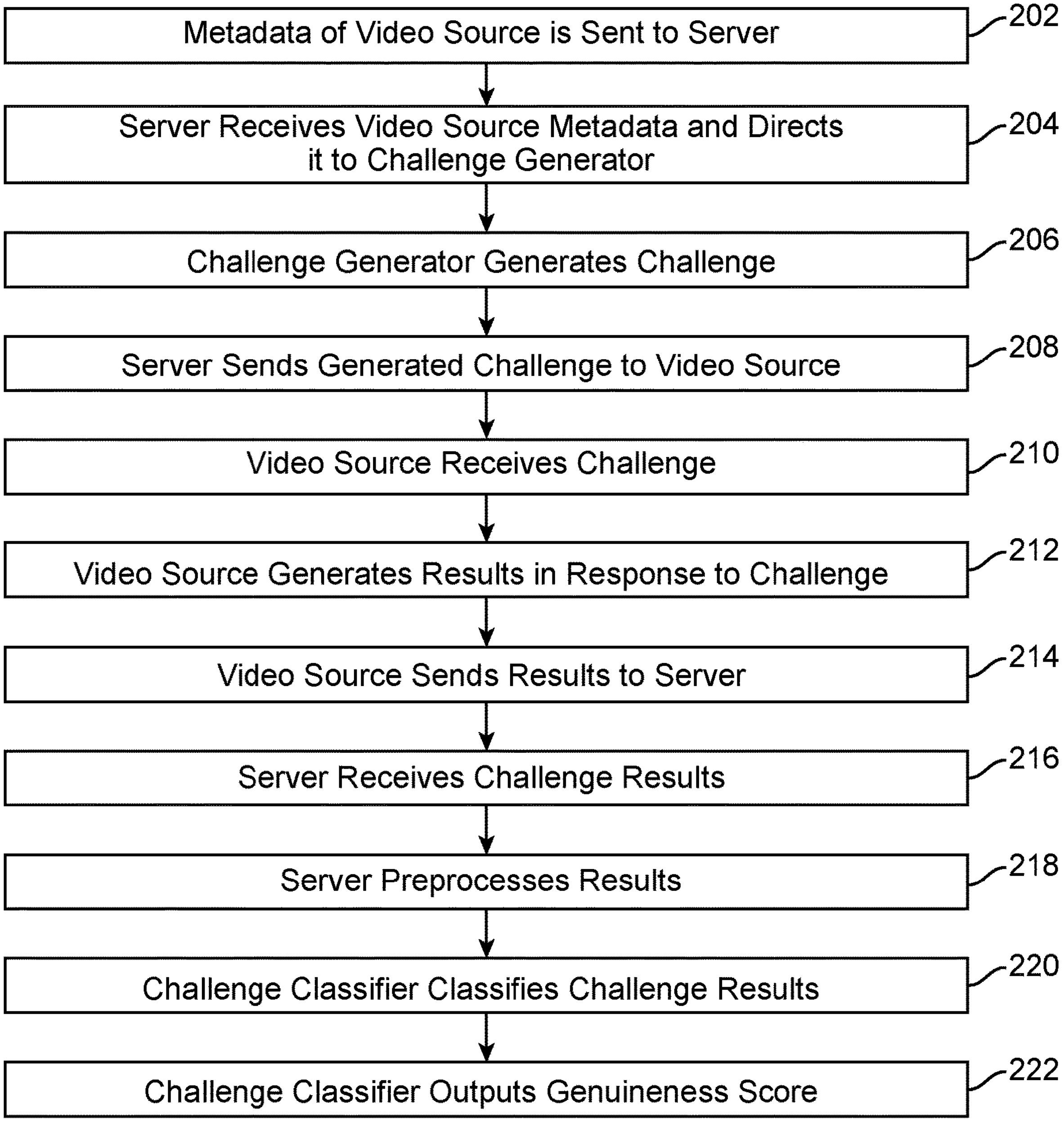
FIG. 2 is a flow diagram illustrating the main steps involved in using the described physical camera provenance scoring system to determine whether a purported source of video imagery originated from a genuine physical camera.
Figure 3:
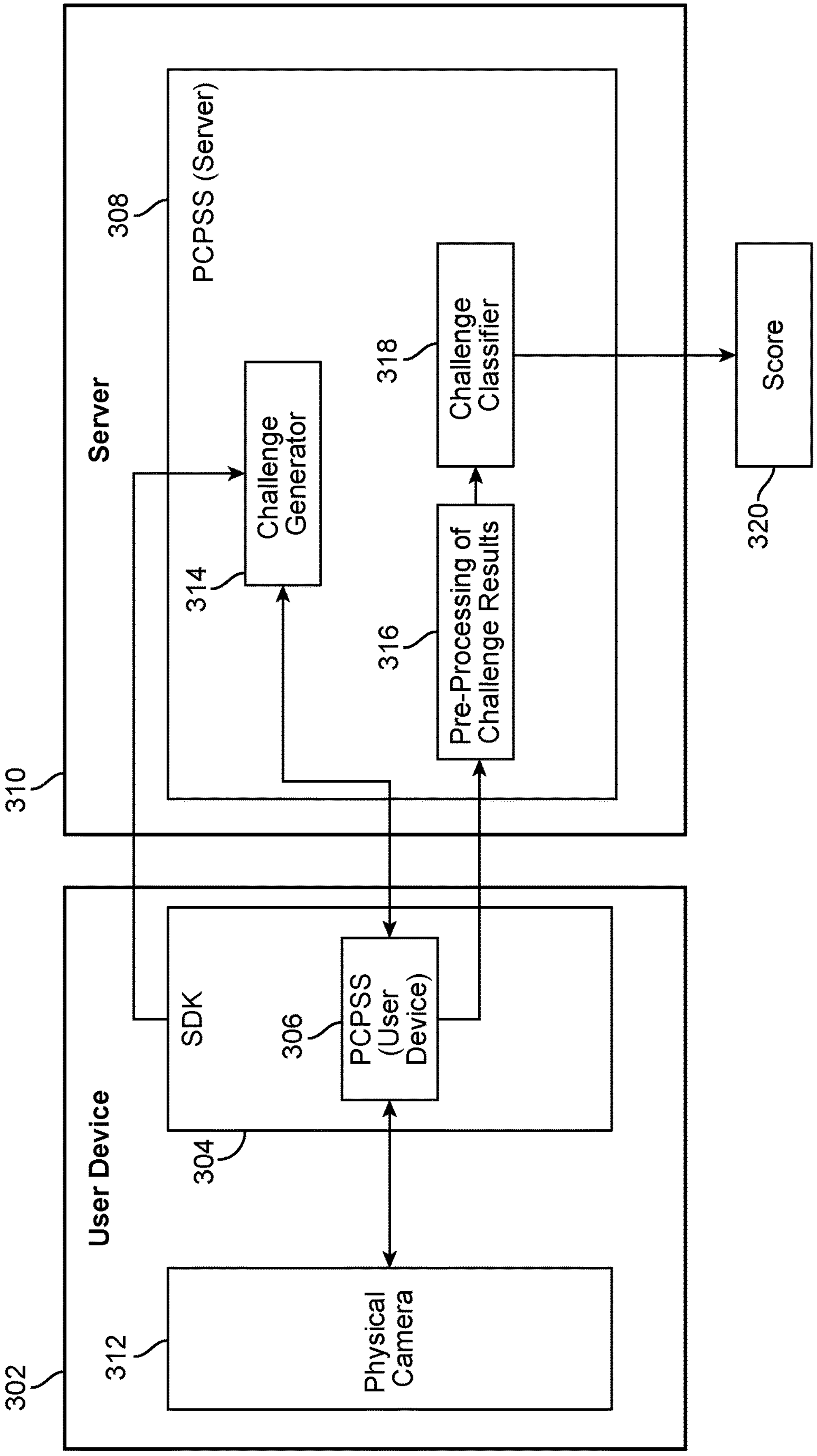
FIG. 3 is a high-level block diagram showing various modules of a physical camera provenance scoring system.

FIG. 2 is a flow diagram illustrating the main steps involved in using the PCPSS to determine whether a purported source of video imagery originated from a genuine physical camera. The steps of FIG. 2 are described in conjunction with FIG. 3, which is a high-level block diagram showing various modules of PCPSS. In FIG. 3, the source of video imagery is shown as user device 302, which includes SDK 304 within which PCPS (User Device) software module 306 runs. The case in which the video is received from an attacker device, as shown in FIG. 1, is omitted in FIG. 3 for purposes of clarity. The modules shown within PCPSS (Server) 308 hosted on server 310 are the same in either case.

User device 302 is in data communication with server 310 via a wide-area network. The server is remote from the user device and connected to it either wirelessly or with a wired connection via the Internet. The server may be a discrete system or implemented in the cloud.

In step 202, metadata pertaining to the video source is obtained and sent to server 310. If the video source is genuine, SDK 304 obtains the metadata from physical camera 312. If the video source is not genuine, attacker system 112 generates metadata purporting to come from a genuine physical camera. The metadata is sent to challenge generator 314, a software module of PCPSS (Server) 308. Step 202 typically occurs when the SDK is loaded on the user device, or, in the case of an attacker system, when the virtual camera is initialized. The metadata typically includes a camera model name, as well as metadata describing the device capabilities. In step 204, PCPSS (Server) 308 receives the metadata, where it is directed to challenge generator 314. Upon receipt of the metadata, in step 206, the challenge generator generates one or more challenges designed to distinguish a genuine camera from a virtual camera. The challenges that are generated depend on the metadata received in step 204. In general, the challenge generator issues a combination of challenges that is expected to provide the greatest amount of information in the majority of cases. In cases where the metadata reports a camera name that has been previously received, a set of challenges that provided correct results in the past may be used. The challenge generator may branch to different sets of challenges based on the declared camera hardware type and/or model, browser type (if applicable) and platform specified, for example, by an operating system and version number. Examples of the camera type and/or model include a USB Webcam on a desktop system and an iPhone®14. In one example of conditional branching, if a device reports as being an Android™ phone, the challenges may include attempts to control the flashlight, while such challenges cannot be deployed if a device reports as being an iPhone for which the flashlight may not be controllable via a browser-based SDK.

In step 208, the generated one or more challenges are issued to the video source. When the source is genuine, as illustrated in FIG. 3, the challenge is received by PCPSS (User Device) 306, which forwards the challenge to physical camera 312. When the imagery originates from an attacker system, the challenge is received by the attacker system. In step 210, the video source receives the challenge, and in step 212 it generates results in response to each challenge. In step 214 these results are sent to server 310, where PCPSS (Server) 308 receives the results (step 216) and directs the response to pre-processing module 316. Preprocessing (step 218) involves converting the challenge results data into a form that can be used as input to a classifier. This may include the mapping of categorical values such as browser name, camera name, operating system, and software version into continuous ones. The preprocessed results are sent to challenge classifier 318, which classifies the challenge results (step 210). The challenge classifier may be implemented using a machine learning model or a non-machine learning approach such as a decision tree, or a combination of approaches. Machine learning models may use various techniques, such as support vector machine classification, random forest, decision tree, and neural network. Deployment of such models uses tools such as skikit-learn, PyTorch, and TensorFlow. These techniques and tools are well known to practitioners in the field of machine learning. The classifier may be trained in a supervised, semi-supervised or unsupervised manner. The training data includes challenge results data known to be from a genuine video source and challenge results data from virtual cameras. The training may also include hand-crafted features or logic. The score may be used for automatic decision making or as an aid for a human decision. In step 222, the classifier outputs score 320, which is a measure of the likelihood that the video source is genuine. In some implementations, the score ranges from 0 to 1 such that the closer the value to 0, the greater the confidence that the video source is a malicious virtual camera and the closer the value to 1, the greater the confidence that the video source is a physical camera.

The reported capabilities of the video device that may be requested by the scoring system include video aspect ratio, background blur, brightness, color temperature, contrast, exposure settings, focus settings, frame rate, height, ISO speed, pan, resize mode, saturation, sharpness, tilt, torch, white balance mode, width and zoom.

Various types of challenge may be issued to the video source. In a first challenge type, a request is sent to change one or more settings of the video device, and the challenge results include metadata returned by the video source. In a second type of challenge, a request to perform a certain action is sent to the video source, and the video source responds by performing the action or by not performing the action. In the latter case, the video source may return an error message. In a third type of challenge, the system requests information about various camera properties, and the returned information is inspected in light of the reported camera device name and capabilities. In a fourth type of challenge, the scoring system requests various actions from the video source and determines whether and when the actions were performed and/or what the state of the camera is following execution of the action. In a fifth type of challenge, the challenge affects the computational load on the user/attacker device. The computational load results from the running of computational processes that are part of the verification SDK and/or from computational processes employed as part of the attack, such as image synthesis or video modification prior to imagery injection. In a sixth type of challenge, where a device has multiple cameras, challenges are made independently to each camera or simultaneously to each camera. The timing of such independent challenges may involve changing a sequence of challenges between more than one of the cameras or changing a time interval or time span between video captures requested of a one camera and those requested of another camera.

In various implementations, one or more challenges may be used to determine whether the same camera is being used for a period of imagery capture. The period of imagery capture may span a particular temporal period or may correspond to a single imagery capture session or multiple imagery capture sessions. Such implementations address a situation in which an attacker attempts to provide challenge response data from a physical camera and then attempts to switch to a virtual camera for subsequent imagery submission. Such a threat may be of particular concern in use cases involving ongoing authentication, where imagery may be captured in bursts across an extended session.

The response to challenges may be used not only to determine whether received imagery was generated by a physical or by a virtual camera, but also to determine whether the camera is of a specific model or a particular class of cameras. For example, the camera model may specify a camera manufacturer, a model number, and even a serial number, and the class of camera may be one of a built-in camera, such as those in smartphones, or an attached external camera. This, more fine-grained determination may be used when PCPSS has prior knowledge as to which physical camera is being used, either arising from metadata provided as part of the verification process or from information derived from previous transactions. This may also apply for use cases, such as a kiosk, where the exact hardware is known.

Imagery received from the video source may be analyzed to determine the type of camera that generated the imagery and/or to determine whether the camera type derived from the imagery matches that derived from the challenges.

A determination may be made as to whether the camera type derived from the imagery is consistent with responses to challenges that are designed to have an impact on imagery. For example, where changes are made to the resolution, exposure setting or focus of the camera, these should produce a corresponding change in the imagery.

Various illustrative examples of the various types of challenge are as follows. The challenge requests a change in the video frame rate, and the ability of the video source to comply is determined. Another challenge requests that the video dimensions be changed. The results include the manner in which the challenge is executed and the resulting video width, video height, resize mode, and frame rate. Another challenge requests imagery at a standard camera resolution, such as HD or VGA as well at a non-standard resolution, such as 200×200. While both a physical and a virtual video source would be expected to comply with the request for the standard-resolution imagery, a physical camera would be unable to comply with the request for non-standard-resolution imagery. By contrast, a virtual camera may respond promptly and comply with the request for non-standard-resolution imagery. The comparison of the resulting metadata from the two resolutions may provide a discriminator between a physical camera and a virtual camera video source. An ability to respond with metadata indicating acceptance of a non-standard resolution is Other challenges request the changing of camera settings such as ISO, sharpness, focus distance, and focus mode, and the results include the ability of the camera to comply with the requests. Further such challenges include requesting from the camera information as to its pan, tilt, and zoom capabilities, and the results are compared with the reported camera properties. A challenge requests the availability and content of EXIF metadata from the camera, and the results include the returned metadata. One challenge requests metadata as to the camera's ability to support a torch or flash. If the video source reports that it supports a torch or flash, the challenge may then activate the torch or flash, with the challenge results including the resulting imagery. As indicated above, one type of challenge includes whether the video source returns an error in response to the receipt of the challenge request. The challenge may request the video source to report whether or not it has an accompanying audio device, and if it does, to check that metadata of the video source is consistent with an accompanying audio device.

During each challenge, the results are recorded and the settings of the video source following the challenge may also be recorded. The arrangement of the challenges may be significant. Thus, the challenge sequence Challenge A, Challenge B, Challenge C may yield different results from the sequence Challenge C, Challenge A. Challenge B, both as to the timing of the individual transitions and the state of the video source following completion of the challenge sequence. For example, the challenge sequence Flash Toggle, White Balance Toggle, Frame Rate Change may produce different results from the challenge sequence Frame Rate Change, Flash Toggle, and White Balance Toggle. The results may differ in the time taken to accomplish the individual challenges or the entire challenge sequence, in the rate of change between successive challenges, in the success or failure of each operation, and in the final state or properties of the returned imagery.

The challenges may include requests that are expected to generate failures. For example, a video source claiming to be a low-end webcam, upon receiving a request to switch to high-frame-rate capture mode is expected to fail. However, if the video source is actually a software camera masquerading as a low-end webcam, it may succeed and deliver high-frame-rate imagery. It may also accomplish other challenges more rapidly than would be expected from a low-end webcam.

The score returned by the PCPSS may be used to determine the subsequent actions of application software running on a user device. For example, if the imagery is being captured during verification of the genuine presence of an online user and if the score is below a certain threshold, further challenges may be issued to determine whether the online user is genuinely present or the user may not be allowed to proceed at all. A threshold score value may be determined by running the PCPSS on a test set of data, separate from the data used to train the system. A human may set the threshold value based on the test data results by balancing the error rate in attack classification, known as attack presentation classification error rate (APCER), against the error rate in genuine classification, known as bona fide presentation classification error rate (BPCER). The chosen threshold value may depend on the level of assurance required or the willingness to tolerate risk. A minimum threshold score may be required when verifying an identity of a user before an application such as banking or online shopping is permitted to proceed. In these scenarios, if the PCPSS returns a score indicating that the imagery source may not be genuine, or may have been manipulated in some way, the party relying on the score might decide to refer that transaction to a manual process, ask the end user to try another device, or terminate the transaction altogether.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of verifying a provenance of video received from a video source, the method comprising:
- receiving metadata from the video source, wherein the metadata purports that video received from the video source is captured in real time by a physical camera associated with a user device;
- issuing one or more challenges to the video source;
- receiving from the video source results generated in response to the one or more challenges, wherein the video source results depend on an order in which the one or more challenges were issued;
- inputting the video source results generated in response to the one or more challenges into a machine classifier, wherein the machine classifier is configured to distinguish between challenge results received from a physical camera and challenge results received from a virtual camera;
- using the machine classifier to issue a genuineness score indicating a likelihood that the video source results generated in response to the one or more challenges were received from a physical camera, wherein the genuineness score depends at least in part on a comparison of video source results from a first order in which the one or more challenges were issued and video results from a second order in which the one or more challenges were issued; and
- when the genuineness score exceeds a threshold score, issuing a determination that the provenance of video received from the video source is a physical camera; and
- when the genuineness score is equal to or less than the threshold score, issuing a determination that the provenance of video received from the video source was not captured by a physical camera.

2. The method of claim 1, wherein the one or more challenges comprise a first challenge and a second challenge, and the second challenge is based at least in part on video source results received from the first challenge.

3. The method of claim 1, wherein video source results generated in response to the one or more challenges include information about a state of the video source following completion of the one or more challenges.

4. The method of claim 3, wherein the information about the state of the video source includes at least one of a state of a flash toggle, a state of a white balance toggle, or a frame rate.

5. The method of claim 1, further comprising inputting to the machine classifier a time taken for the video source results to be generated in response to the one or more challenges.

6. The method of claim 1, wherein the genuineness score is used to determine which subsequent action of a plurality of subsequent actions is taken by software executing on an end user device.

7. The method of claim 1, wherein a system associated with the video source includes a plurality of cameras, and the one or more challenges are directed independently to each camera.

8. The method of claim 1, wherein video source results are used to determine whether or not the received video was captured by a camera of at least one of a specific model or a specific class of camera.

9. A method of verifying a provenance of video received from a video source, the method comprising:

receiving metadata from the video source, wherein the metadata purports that video received from the video source is captured in real time by a physical camera associated with a user device;

issuing one or more challenges to the video source;

receiving from the video source results generated in response to the one or more challenges;

inputting the video source results generated in response to the one or more challenges into a machine classifier, wherein the machine classifier is configured to distinguish between challenge results received from a physical camera and challenge results received from a virtual camera;

using the machine classifier to issue a genuineness score indicating a likelihood that the video source results generated in response to the one or more challenges were received from a physical camera;

when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera; and wherein a system associated with the video source includes a plurality of cameras, and the one or more challenges are directed simultaneously to each camera.

10. A method of verifying a provenance of video received from a video source, the method comprising:

receiving metadata from the video source, wherein the metadata purports that video received from the video source is captured in real time by a physical camera associated with a user device wherein the video is received from the video source over a first imagery capture session and over a second imagery capture session;

issuing one or more challenges to the video source;

receiving from the video source results generated in response to the one or more challenges;

inputting the video source results generated in response to the one or more challenges into a machine classifier, wherein the machine classifier is configured to distinguish between challenge results received from a physical camera and challenge results received from a virtual camera;

using the machine classifier to issue a genuineness score indicating a likelihood that the video source results generated in response to the one or more challenges were received from a physical camera;

when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera; and wherein the genuineness score is based in part on a comparison of video source results received in response to one or more challenges issued during the first imagery capture session with video source results received in response to one or more challenges issued during the second imagery capture session.

11. A method of verifying a provenance of video received from a video source, the method comprising:

receiving metadata from the video source, wherein the metadata purports that video received from the video source is captured in real time by a physical camera associated with a user device;

issuing one or more challenges to the video source;

receiving from the video source results generated in response to the one or more challenges;

inputting the video source results generated in response to the one or more challenges into a machine classifier, wherein the machine classifier is configured to distinguish between challenge results received from a physical camera and challenge results received from a virtual camera;

using the machine classifier to issue a genuineness score indicating a likelihood that the video source results generated in response to the one or more challenges were received from a physical camera;

analyzing the received video to determine a first type of a camera that captured the video;

using the video source results to determine a second type of camera that captured the received video; and wherein the genuineness score is based in part on a match between the first type of camera and the second type of camera; and when the genuineness score exceeds a threshold score, issuing a determination that the provenance of video received from the video source is a physical camera; and when the genuineness score is equal to or less than the threshold score, issuing a determination that the provenance of video received from the video source was not captured by a physical camera.

12. The method of claim 11, wherein the one or more challenges comprise a first challenge and a second challenge, and the second challenge is based at least in part on video source results received from the first challenge.

13. The method of claim 11, wherein the video source results received in response to the one or more challenges depend on an order in which the one or more challenges were issued.

14. The method of claim 13, wherein the genuineness score depends at least in part on a comparison of video source results from a first order in which the one or more challenges were issued and video source results from a second order in which the one or more challenges were issued.

15. The method of claim 11, wherein video source results generated in response to the one or more challenges include information about a state of the video source following completion of the one or more challenges.

16. The method of claim 15, wherein the information about the state of the video source includes at least one of a state of a flash toggle, a state of a white balance toggle, and a frame rate.

17. The method of claim 11, further comprising inputting to the machine classifier a time taken for the video source results to be generated in response to the one or more challenges.

18. The method of claim 11, wherein the video source results include video source metadata and video imagery and the genuineness score is based at least in part on a comparison of the video source metadata with the received video imagery.

19. The method of claim 11, wherein the one or more challenges request information about properties of a camera of the video source and the genuineness score depends at least in part on a comparison of the video source results with at least one of a camera device name and camera capabilities reported by metadata received from the video source.

20. The method of claim 11, wherein the one or more challenges affect a computational load on a system associated with the video source and the video results include information indicating the computational load on the system.

21. The method of claim 11, wherein the system associated with the video source includes a plurality of cameras, and the one or more challenges are directed independently to each camera.

22. The method of claim 11, wherein the system associated with the video source includes a plurality of cameras, and the one or more challenges are directed simultaneously to each camera.

23. A computer program product comprising:

a non-transitory computer-readable medium with computer-readable instructions encoded thereon, wherein the computer-readable instructions, when processed by a processing device instruct the processing device to perform a method of verifying a provenance of video received from a video source, the method comprising:
 - receiving metadata from the video source, wherein the metadata purports that video received from the video source is captured in real time by a physical camera associated with a user device;
 - issuing one or more challenges to the video source;
 - receiving from the video source results generated in response to the one or more challenges;
 - inputting the video source results generated in response to the one or more challenges into a machine classifier, wherein the machine classifier is configured to distinguish between challenge results received from a physical camera and challenge results received from a virtual camera;
 - using the machine classifier to issue a genuineness score indicating a likelihood that the video source results generated in response to the one or more challenges were received from a physical camera;
 - analyzing the received video to determine a first type of a camera that captured the video;
 - using the video source results to determine a second type of camera that captured the received video:
 - basing the genuineness score in part on a match between the first type of camera and the second type of camera; and
 - when the genuineness score exceeds a threshold score, issuing a determination that the provenance of video received from the video source is a physical camera; and
 - when the genuineness score is equal to or less than the threshold score, issuing a determination that the provenance of video received from the video source was not captured by a physical camera.

24. A user device comprising:

a memory for storing computer-readable instructions; and a processor connected to the memory, wherein the processor, when executing the computer-readable instructions, causes the user device to perform a method of verifying a provenance of video received from a video source, the method comprising:
 - receiving metadata from the video source, wherein the metadata purports that video received from the video source is captured in real time by a physical camera associated with a user device;
 - issuing one or more challenges to the video source;
 - receiving from the video source results generated in response to the one or more challenges;
 - inputting the video source results generated in response to the one or more challenges into a machine classifier, wherein the machine classifier is configured to distinguish between challenge results received from a physical camera and challenge results received from a virtual camera;
 - using the machine classifier to issue a genuineness score indicating a likelihood that the video source results generated in response to the one or more challenges were received from a physical camera;
 - analyzing the received video to determine a first type of a camera that captured the video;
 - using the video source results to determine a second type of camera that captured the received video;
 - basing the genuineness score in part on a match between the first type of camera and the second type of camera; and
 - when the genuineness score exceeds a threshold score, issuing a determination that the provenance of video received from the video source is a physical camera; and
 - when the genuineness score is equal to or less than the threshold score, issuing a determination that the provenance of video received from the video source was not captured by a physical camera.

* * * * *